P. C. & O. NELSON.
ATTACHMENT FOR AUTOMOBILES.
APPLICATION FILED DEC. 6, 1915.
1,198,372.
Patented Sept. 12, 1916.
2 SHEETS—SHEET 2.
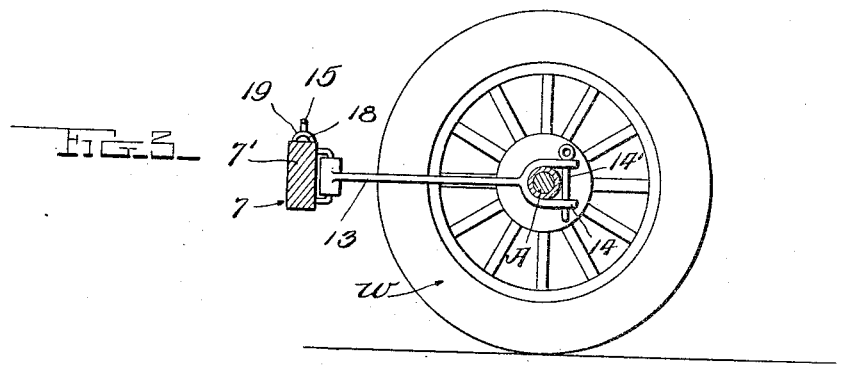
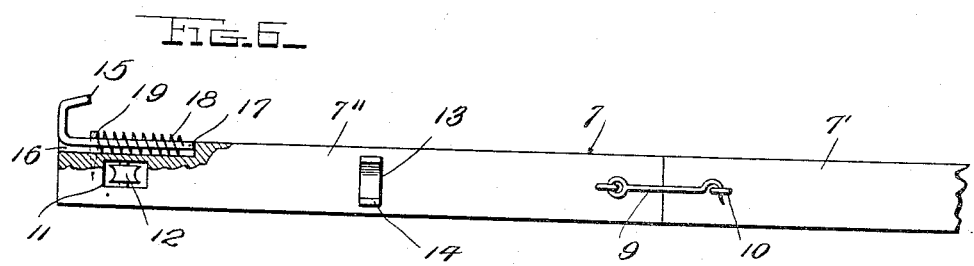
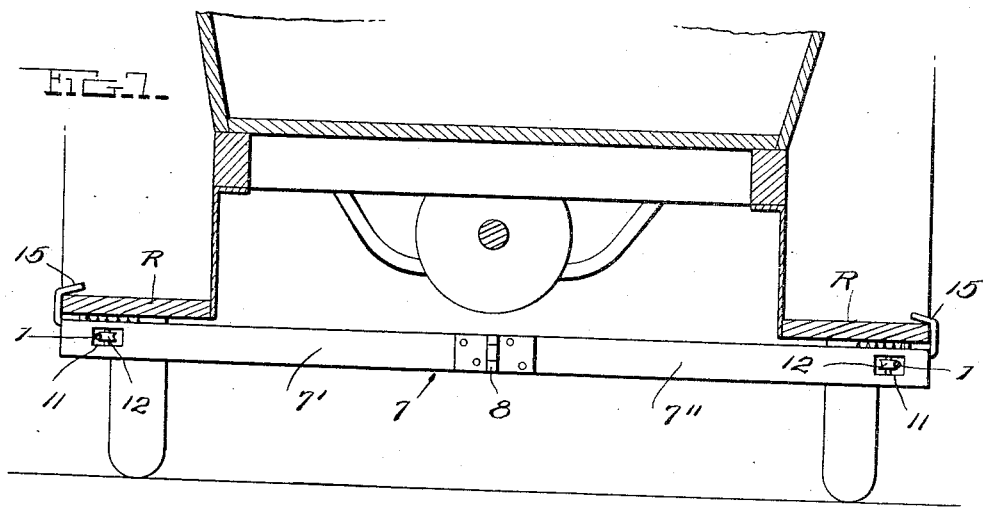

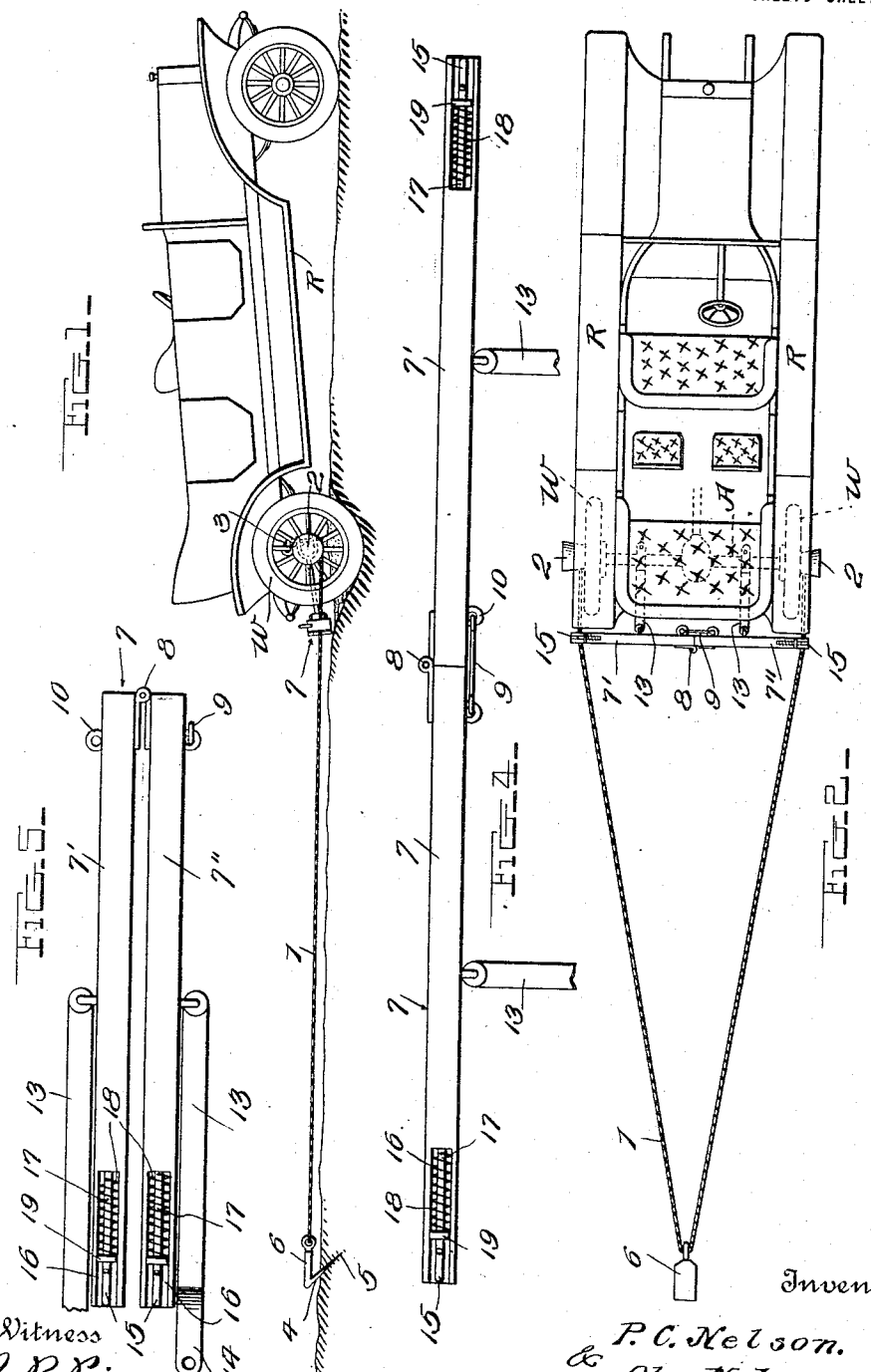

UNITED STATES PATENT OFFICE.

PAUL C. NELSON AND OLE NELSON, OF KENSINGTON, MINNESOTA.

ATTACHMENT FOR AUTOMOBILES.

1,198,372.     Specification of Letters Patent.     Patented Sept. 12, 1916.

Application filed December 6, 1915. Serial No. 65,381.

*To all whom it may concern:*

Be it known that we, PAUL C. NELSON and OLE NELSON, citizens of the United States, residing at Kensington, in the county of Douglas and State of Minnesota, have invented certain new and useful Improvements in Attachments for Automobiles; and we do declare the following to be a full, clear, and exact description of the invention, such as will enable others skilled in the art to which it appertains to make and use the same.

This invention relates to attachments for vehicles, particularly automobiles, by the means of which the same may be drawn out of mud holes, sand pits and the like, by their own power.

The principal object of this invention is to provide a device of this character by the use of which the vehicle may be moved either backward or forward.

A further object is to provide a device through the use of which the pulling power may be exerted upon both ends of the rear axle at the same time.

An additional object is to provide a simply constructed device of this character which can be readily folded into a small compact article for carrying in the vehicle.

With these and many other objects in view the invention relates to certain novel features of construction, and the combination and arrangement of parts which will hereinafter be more particularly described and claimed and shown in the drawings wherein:

In the accompanying drawings: Figure 1 is a side elevation of an automobile showing the application of our invention thereto; Fig. 2 is a top plan view of the parts shown in Fig. 1; Fig. 3 is a detail transverse section showing one method of attaching the spacing bar to the vehicle axle; Fig. 4 is a top plan view of the spacing bar on an enlarged scale; Fig. 5 is a similar view of the spacing bar in folded position; Fig. 6 is an enlarged detail side elevation of one end of the spacing bar; and Fig. 7 is a transverse section through a vehicle showing a second method of attaching the spacing bar.

As shown in the various figures of the drawings, this improved device may be either used to pull the machine to which it is applied backward or forward. When used to pull the machine in a backward direction, the device is applied to the rear axle A, but when it is desired to propel the vehicle forwardly, the attachment is secured to the running boards R of the vehicle. In either case, however, the cable 1 which moves the machine is guided onto the drums 2 secured to the hubs of the rear axle. These drums 2 are here shown as substantially frusto-conical shape with their smaller ends next the wheels W of the vehicle and are secured thereon in any preferred manner. We preferably attach them merely by inserting the projecting hubs of the axle into the apertures which extend through said drums. If the drums fit rather tightly to the hubs, they will be effectively held thereon when the cable has been wound a few times therearound. The opposite ends of the cable 1 are provided with hooks 3 which are adapted to engage the spokes of the wheels W. After said hooks have been caught around the spokes, the adjacent portions of the cable are then given a few turns around the drums. The central portion of the cable is connected with a stake driven in the ground either in front of or behind the vehicle. We preferably provide a peculiarly shaped stake for this purpose which is substantially an acute angular hook 4, the lower end 5 being sharpened, and adapted to be driven into the ground, while the upper arm 6 is apertured to receive the cable 1. It will be seen that after driving the end 5 into the ground, the greater the tension on the cable, the farther the hook will be forced into the ground.

Inasmuch as a drum is provided for each rear hub and only one stake is used, it is obvious that the cable connecting the drums with the stake will tend to rub against the wheels W when the vehicle is being pulled out of the mud hole or the like. Therefore, we have provided a novel and very efficient means for guiding the cable while it is being wound upon the drums 2. For this purpose we preferably use a bar 7 here shown as formed of two sections 7' and 7" hingedly connected together at 8. A hook 9 is attached to the opposite side of one of the members of the bar 7 from the hinge 8 and is adapted to engage an eye 10 on the other section when the bar is in operative position. When, however, it is desired to fold the bar 7 for the purpose of storage and transportation, the hook 9 is disengaged from its eye, and the two sections 7' and 7" may be folded upon each other into a small space. The cable 1 passes through apertures 11 formed in the outer ends of the sections of the bar and is adapted to run on anti-friction rollers 12 rotatably mounted in said apertures.

When the device is to be used in pulling the vehicle in a rearward direction, the bar 7 is positioned to the rear of the rear axle and parallel thereto. In order to maintain said bar in this position, a pair of laterally extending arms 13 is provided, one end of said arms being pivoted to the forward side of each of the sections of the bar 7. Any preferred means may be employed for pivotally mounting the arms to the bar, the arms being pivoted merely for the purpose of folding the same against the adjacent sections of the bar when the same is folded as before mentioned. The free ends of the arms 13 are bifurcated as shown at 14 and are adapted to embrace the axle of the vehicle, the pins 14' being passed through apertures in the extreme outer ends of the arms to hold the same on the vehicle axle. The arrangement of the various parts heretofore described are clearly shown in operative position in Figs. 1, 2 and 3 of the drawings.

After the vehicle has been pulled backwardly out of the mud hole or the like, the arms 13 are disengaged from the axle A, the drums 2 removed from the hubs of said axle, and the stake or hook 4 lifted from the ground, and the device is then ready to be folded in order to enable it to be carried in the body of the vehicle. It may be readily folded as hereinbefore described by merely disconnecting the hook 9 and allowing the two sections of the bar 7 to fold upon themselves, the arms 13 readily falling into folded position when not engaged.

The arms 13 of the device are not used when it is desired to pull the vehicle in a forward direction, they being allowed to remain in a folded position when the bar 7 is straightened into its operative position. In using the device to pull the machine forwardly, the hook 4 is driven into the ground in front of the machine and the cable 1 extended therefrom to the drums 2 of the hubs of the rear axle A as hereinbefore described. The bar 7 is now, however, disposed in front of the axle A and parallel thereto, and is held in this position by the hooks 15 which extend from opposite ends of the bar 7 and engage the edges of the running boards R on opposite sides of the vehicle. This disposes the bar 7 above the ground and out of the way of the wheels W, yet permits the same to effectively guide the cable onto the drums 2.

We preferably provide the hooks 15 with springs in order that they will effectively engage said running boards. For carrying out this construction, the outer ends of the sections of the bar 7 are grooved as shown at 16 to receive the shanks 17 of the hooks 15. An expansion spring 18 surrounds the shank 17 and is secured by one end to the free end thereof, the opposite end of the spring abutting a stop 19 of any suitable form as shown. It will be seen that as the hook 15 is drawn downwardly, the spring 18 will compress and will tend to return the hook 15 to its first position when released. This arrangement permits the hooks to be used on running boards of various widths. It is understood, however, that the bar 7 is substantially of a length equal to the width of the vehicle body, or the length of the axle A. After the machine has been pulled forwardly, the arm can be disengaged and folded for storage in the vehicle.

From the foregoing description taken in connection with the accompanying drawings, it will be seen that we have invented an improved foldable device which will effectively guide a cable onto drums secured on the hubs of the axle of the vehicle when said cable is being used to pull the machine out of the mud holes or the like in the road. It is also obvious that the device may be used with equal facility whether the vehicle is to be moved toward the rear or in a forward direction.

We claim as our invention:

1. In a device of the class described comprising a spacing bar hinged intermediate its ends to fold, means for holding the sections of said bar in longitudinal alinement, and a laterally swinging arm hinged to each of the parts of said bar, said arms folding into contact with the bar when the same is folded, and being adapted when in extended position to hold said bar in operative position on a vehicle.

2. The combination with a vehicle; of drums on the hubs of a pair of wheels thereof, a cable around each of said drums, a spacing bar of a length substantially equal to the distance between said drums and hinged intermediate its ends to fold, the opposite ends of said bar being apertured to receive said cables, anti-friction rollers in said apertures to guide the cables, a hook carried by one section of the hinged bar, an eye carried by the other section and receiving said hook to retain said sections in longitudinal alinement, and a pair of laterally swinging arms, one being hinged to each of the sections of said bar, the free ends of said arms being bifurcated to engage the axle of the vehicle to maintain said bar in operative position, said arms folding upon the sections of the bar when the same is inoperative.

3. In a device of the class described, a spacing bar having its opposite ends longitudinally grooved, hooks having the shanks thereof in said grooves, springs surrounding said shanks and having one end connected thereto to retain said hooks in retracted position, said hooks being adapted to grip the edge of the running boards on the opposite sides of a vehicle, and means on opposite ends of the bar to guide a pair of cables.

In testimony whereof we have hereunto set our hands in presence of two subscribing witnesses.

PAUL C. NELSON.
OLE NELSON.

Witnesses:
O. H. HARRISON,
C. S. SAMPSON.